May 13, 1930. B. M. SCHAUMAN 1,758,377
AIRCRAFT
Filed Feb. 4, 1926 6 Sheets-Sheet 2
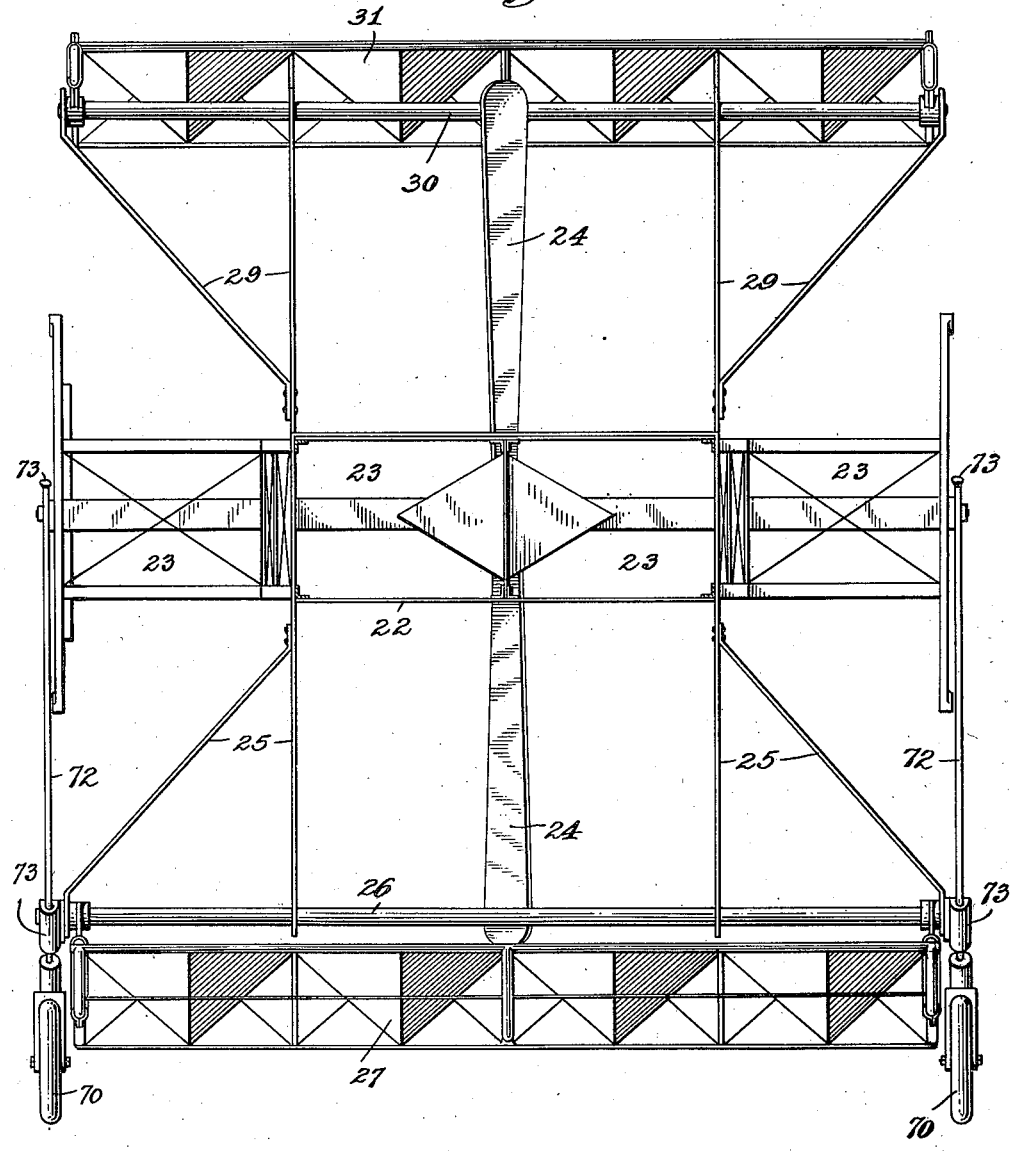

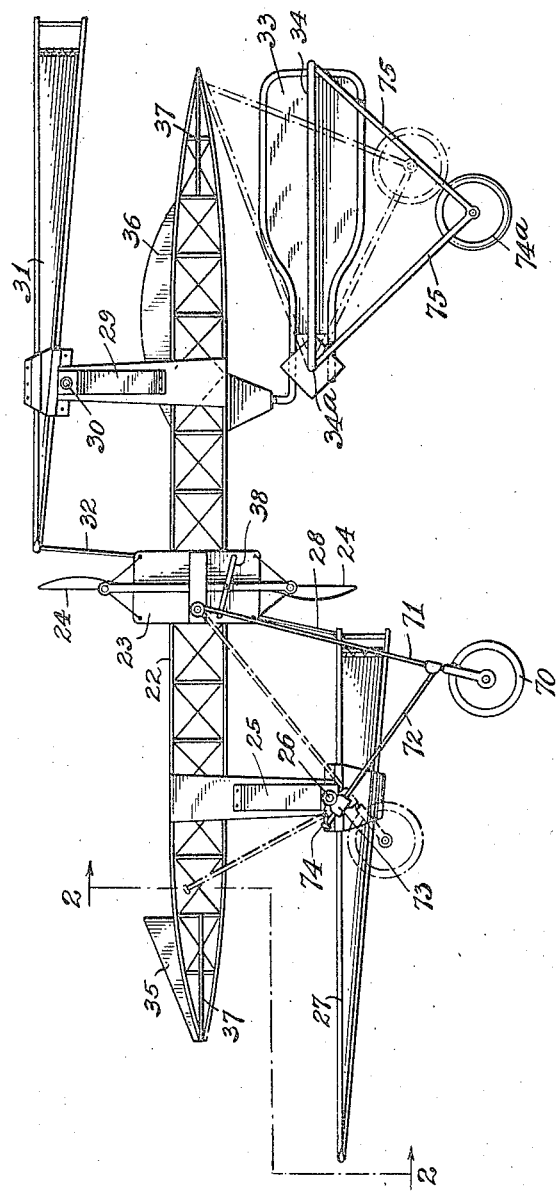

May 13, 1930.  B. M. SCHAUMAN  1,758,377
AIRCRAFT
Filed Feb. 4, 1926  6 Sheets-Sheet 3
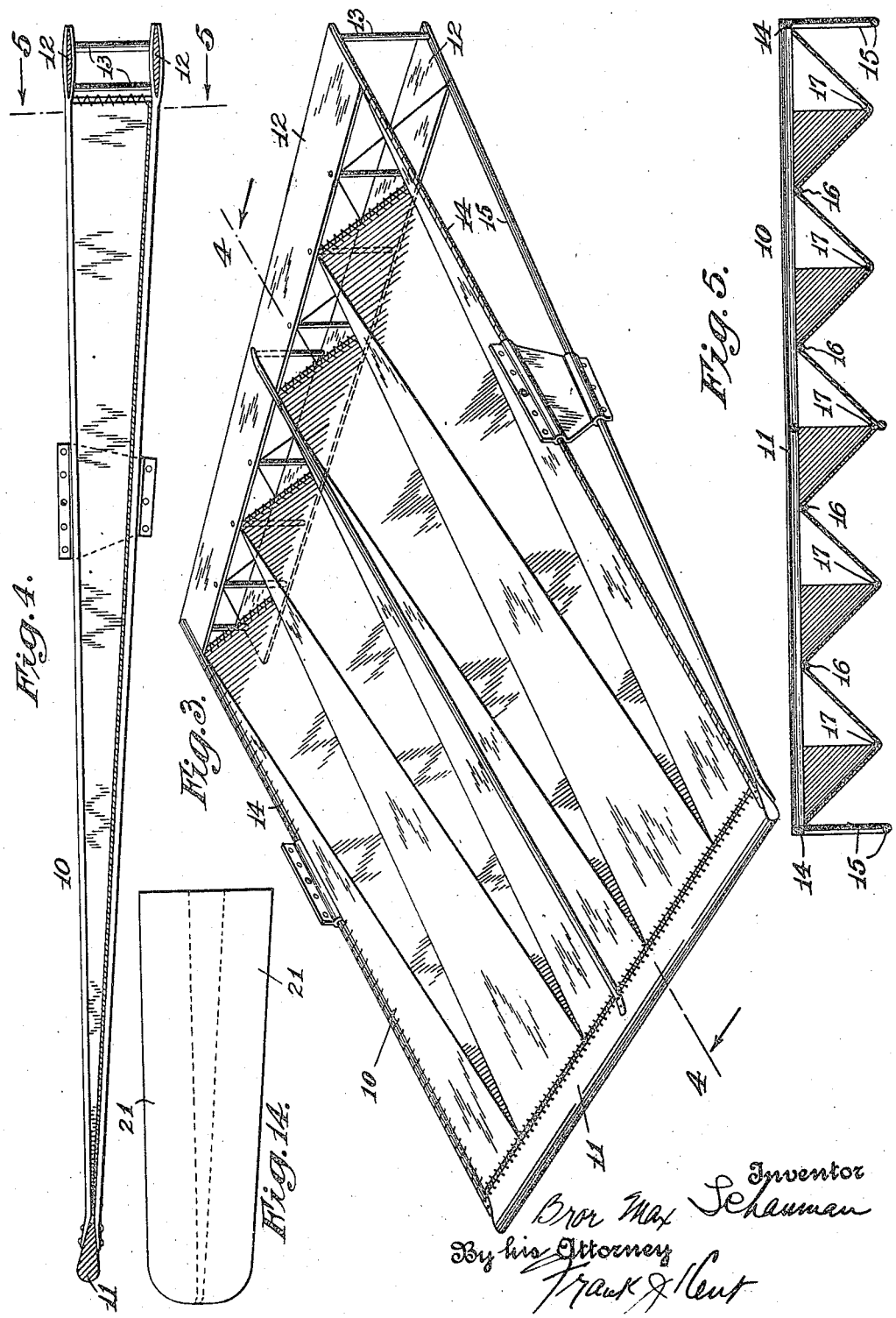

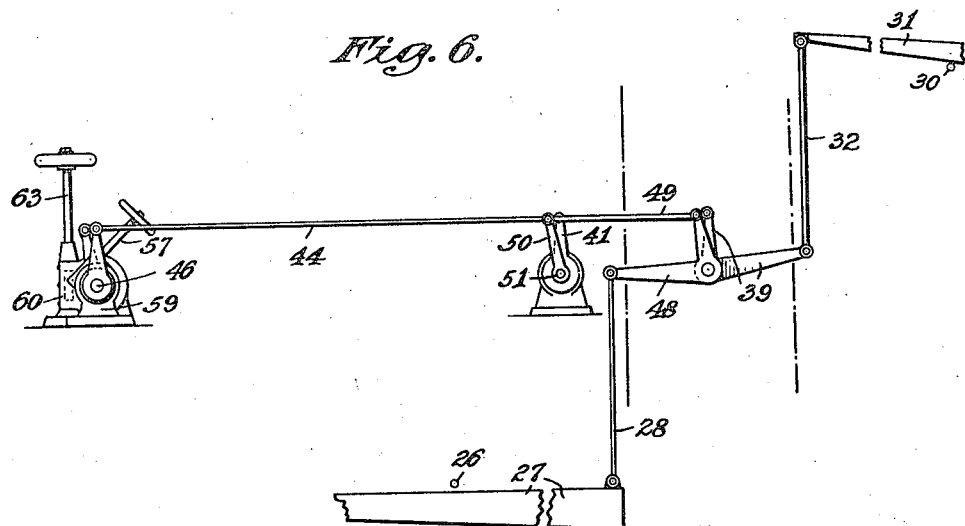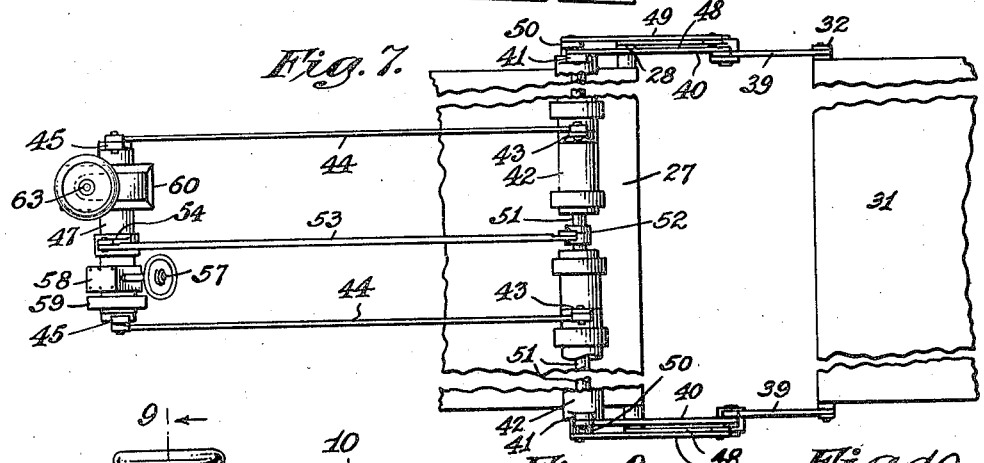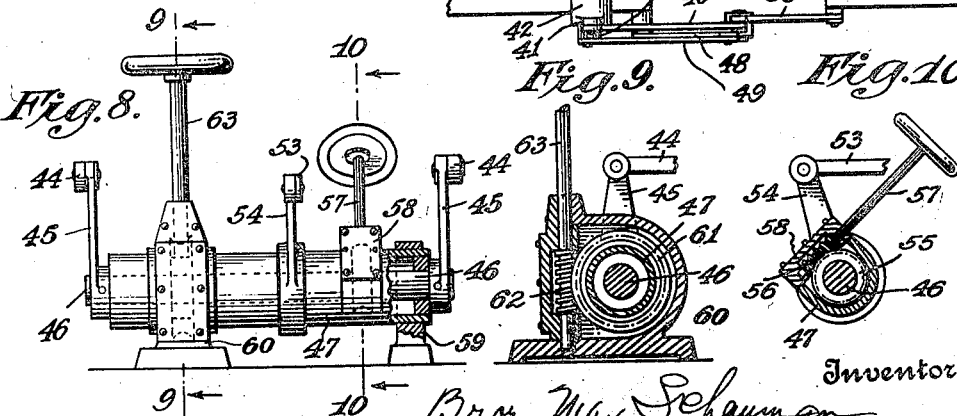

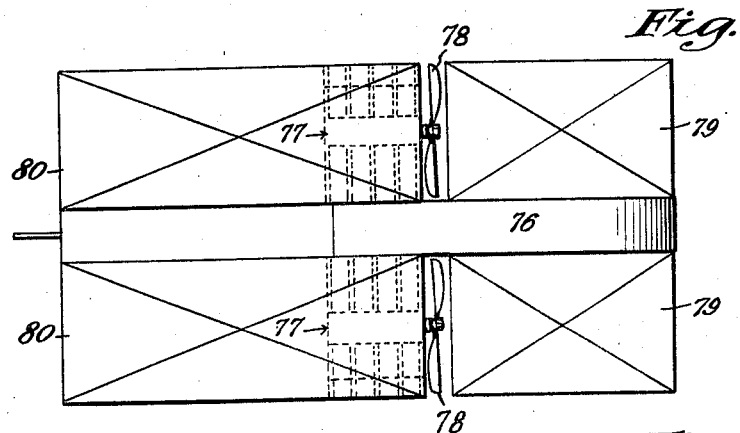
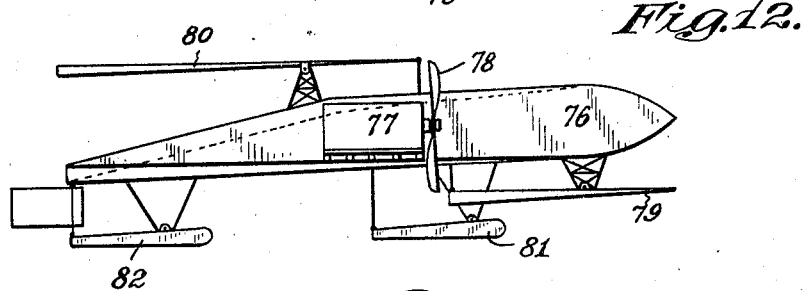
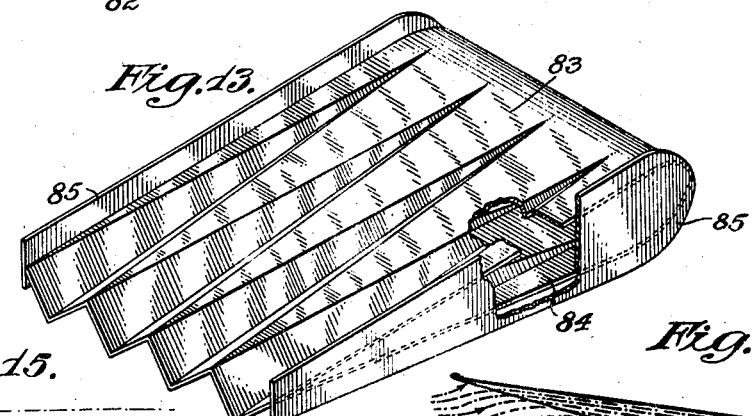
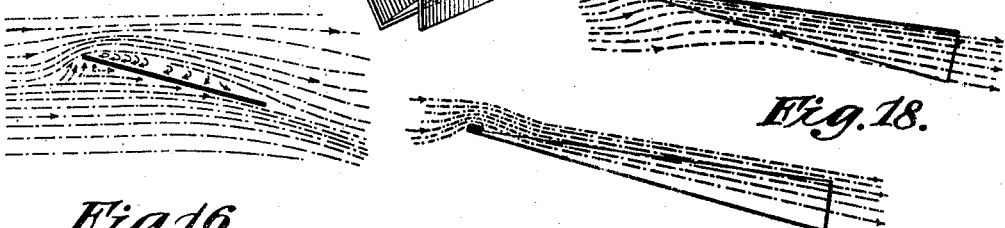
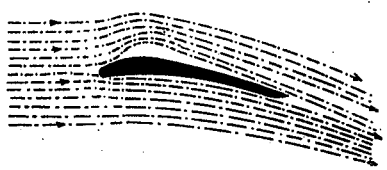

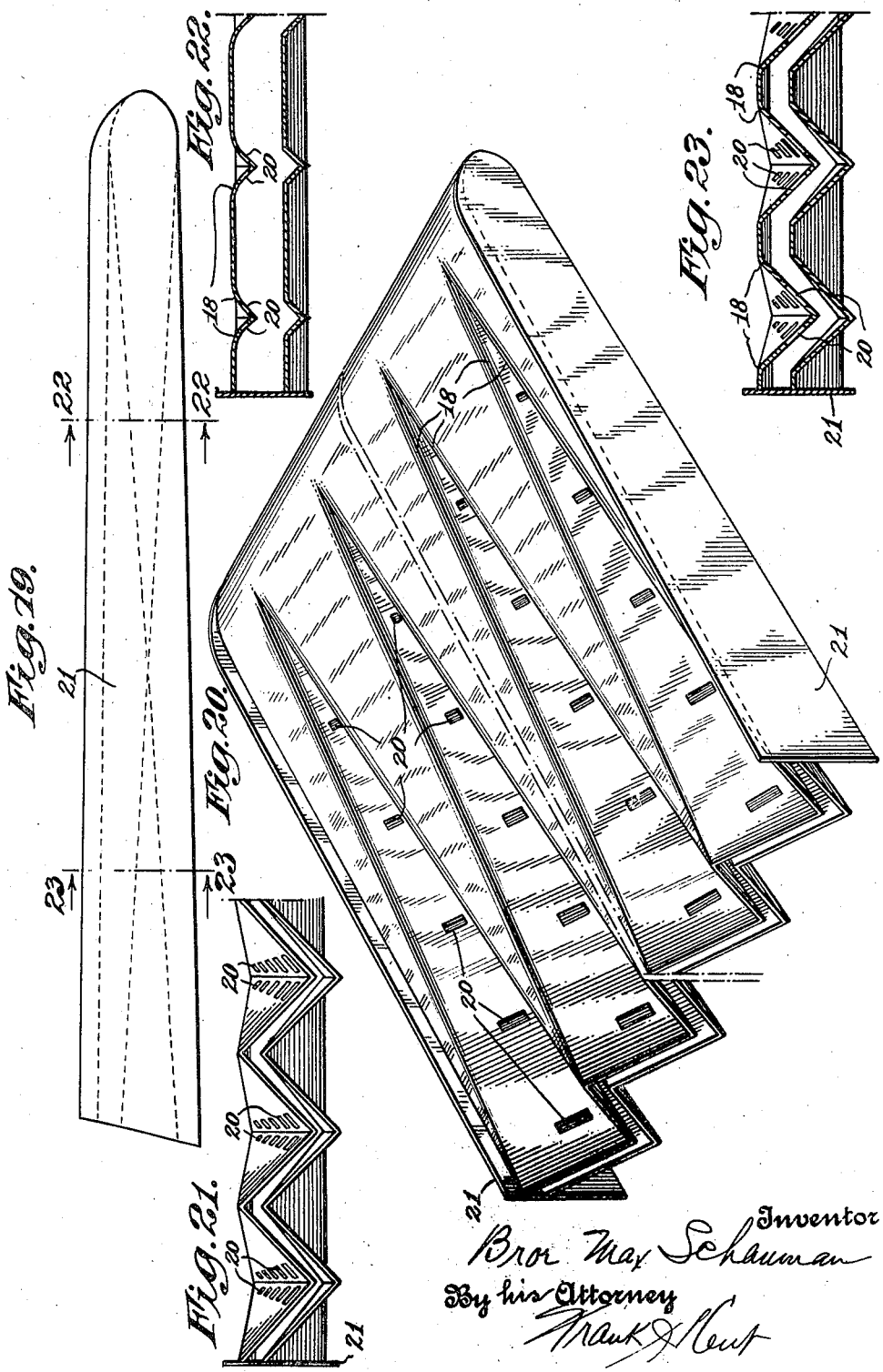

Patented May 13, 1930

1,758,377

UNITED STATES PATENT OFFICE

BROR MAX SCHAUMAN, OF HIGHLANDS, NEW JERSEY, ASSIGNOR, BY MESNE ASSIGNMENTS, TO THORD-GRAY HOLDING CORPORATION, OF NEW YORK, N. Y., A CORPORATION OF NEW YORK

AIRCRAFT

Application filed February 4, 1926. Serial No. 85,933.

This invention relates to airplanes, and has for its object the provision of a wing with a very high lifting efficiency and having such unique aerodynamic properties it can be designed with an aspect ratio radically different from the usual practice to thereby produce a more compact and stable machine.

An additional object of the invention is to so locate the wings in relation to the propeller that the suction and compression of the propeller are fully utilized to increase the lifting capacity of the wings.

Another feature of importance is the adjustable mounting of the wings whereby the angle of incidence of both wings can be altered simultaneously, or the angle of one wing relative to the other can be changed.

Other objects and advantages will become apparent as the description proceeds.

Referring to the drawings,

Figure 1 is a side elevation of a machine embodying the invention;

Figure 2 is a cross section on line 2—2 of Figure 1, parts being omitted;

Figure 3 is a perspective of the improved aerofoil or wing;

Figure 4 is a section on line 4—4 of Figure 3;

Figure 5 is a section on line 5—5 of Figure 4;

Figure 6 is a side elevation of mechanism for controlling the angle of incidence of the wings;

Figure 7 is a plan view of the structure shown in Figure 6;

Figure 8 is an end elevation of part of the mechanism shown in Figure 6;

Figure 9 is a cross section on line 9—9 of Figure 8;

Figure 10 is a cross section on line 10—10 of Figure 8;

Figure 11 is a plan of a modification;

Figure 12 is a side elevation of the machine shown in Figure 11;

Figure 13 is a perspective partly broken away of the pontoon shown in Figure 12;

Figure 14 is a side elevation of part of the wing shown in Figure 3 with side boards attached thereto;

Figure 15 is a diagrammatic view showing the air flow around a flat wing;

Figure 16 is a diagrammatic view showing the air flow around a cambered wing;

Figure 17 is a diagrammatic view showing the air flow through one of the compression channels on the under side of the wing of the present invention;

Figure 18 is a diagrammatic view showing the air flow through one of the vacuum channels on the upper side of the improved wing;

Figure 19 is a side elevation of a modified wing structure;

Figure 20 is a perspective view of the wing shown in Figure 19;

Figure 21 is a rear elevation of the wing shown in Figure 19;

Figure 22 is a section on line 22—22 of Figure 19;

Figure 23 is a section on line 23—23 of Figure 19.

Referring more particularly to the drawings, 10 indicates one of the wings, shown in detail in Figure 3. The front edge of the wing consists of a spar 11, while the rear end is formed by a frame composed of two members 12 held in spaced-apart relation by posts 13. Side members 14 connect spar 11 with the top of the rear frame, while members 15 connect the spar 11 with the bottom of the frame. Supporting rods 16 extend in a zigzag manner from the front spar 11 to the top member of the rear frame, and rods 17 extend from the spar 11 to the bottom member of the rear frame in the interval of the rearwardly opening V's formed by the rods 16. The frame thus constructed is covered with any suitable fabric in the manner indicated in Figures 3 and 5. The result is an aerofoil the upper surface of which is formed with V-shaped channels which come to a point behind the entering edge and increase gradually in depth and width to the rear edge of the wing. The channels on the under side of the wing start behind the entering edge with a broad flat bottom and have sloping sides that gradually approach each other and increase in height until at the rear of the wing they end with a V-shape. The materials and mechanical structure of the wing are unimportant, since it will be obvious that the wing may be constructed of metal or any suitable material assembled in any convenient manner. The important features of this aerofoil are the provision of channels in the upper surface that gradually increase in both depth and width from the front to the rear and the provision of channels in the lower surface that gradually increase in depth but with converging walls.

As appears in Fig. 3, the top of the wing has flat areas or surfaces between the channels in the top of the wing; these areas or sections are triangular and point rearward due to the zig-zag arrangement of the rod 16, and the triangular areas or sections lie between the channels in the upper face of the wing. The same areas constitute the bottoms of the channels in the lower face of the wing, the bottoms becoming narrower from front to back.

It has been demonstrated experimentally that a wing constructed in the manner set forth above has a much greater lifting efficiency than any type of wing now in use. Information concerning the performance of an aerofoil cannot well be derived theoretically on account of the complexity of the problem, but an attempt will be made to set forth the principles involved in the present wing along the lines of accepted theory.

It should be borne in mind that as a wing moves through the air it deflects the air downward compressing the air below it and creating a positive pressure on the lower surface of the wing. At the same time the movement of the wing causes a rarefaction or negative pressure on the upper surface thereof. These two pressures combine to give the wing its lifting power, although it should be noted that the rarefaction above the wing contributes the larger portion of the lifting power, commonly as much as three-fourths of the total lift being due to this rarefaction.

Figure 15 shows in a general way the air flow around a flat wing. The entering edge violently disrupts the air stream producing air eddies that swirl around into the area of negative pressure and reduce the extent to which rarefaction can take place. This turbulence increases wing resistance and decreases lift.

The cambered wing of Figure 16 has more of a stream line form and hence does not produce air eddies as does the flat wing. However, the curved entering edge of the cambered wing throws the air stream violently upward in a bow wave, which increases the area of negative pressure thereby increasing the lift, but at the same time using energy and creating resistance in thus disturbing the air. The highest point of the bow wave is not far from the entering edge, and from this highest point the air moves down toward the wing gradually reducing the area of rarefaction until it practically disappears over the rear third of the wing. At the same time the air striking the forward part of the under surface rebounds therefrom and interferes with lower strata of air in such a way as to cause a reduction of the positive pressure toward the rear of the under surface. As the result of this action above and below the aerofoil, the rear part of the wing is not utilized for lifting purposes, and the center of combined upward lift is one-third back from the entering edge.

Another serious defect of the cambered wing is the fact that the center of pressure does not remain constant but shifts toward the rear as the angle of incidence decreases. This means that when the pilot decreases the angle of incidence to descend the center of pressure shifts toward the rear of the wing and causes him to dive at a steeper angle than he had intended.

The air flow around the improved aerofoil of the present invention is illustrated in Figures 17 and 18. Figure 17 shows the flow through one of the compression channels on the under surface of the wing. The air strikes the forward part of the under surface and rebounds therefrom as it does with any wing. This rebound would tend to produce a slight rarefaction toward the rear of the wing but the air moving along the channel is compressed by the converging sides producing denser layers of air in the top of the channel as shown by the closely spaced lines in Figure 17. This compression of the air toward the rear of the wing equalizes the lifting power of the upward pressure along the fore and aft line of the wing.

Figure 18 shows the air flow through one of the vacuum channels on the upper surface of the wing. The air is not violently disturbed, but falls gently toward the entrance of the channel. This results in a relatively narrow zone of rarefaction above the front part of the wing, but as the air moves along the gradually deepening and widening channel it becomes further rarefied, and the pressure at the bottom of the channel grows less toward the rear of the wing producing a gradually deepening zone of rarefaction along the wing as shown by the diverging lines in Figure 18. As a result the negative pressure above the wing is not localized above the front third of the wing, but is distributed almost uniformly along the wing. In fact the rarefaction becomes greater toward the rear of the wing, so that in a wing proportioned as shown in Figure 3 the center of lift is slightly back of the center.

The air flow over the top of the wing can be considered from another viewpoint. As the wing moves through the air at any angle of incidence the falling away of the upper surface produces a zone of rarefaction back of the entering edge because the air cannot at once flow down to the falling surface. But it does flow down to the upper surface as quickly as it can and in doing so reduces the area of rarefaction and confines it to the front part of the wing. The problem then is to drain away these downwardly flowing currents of air and since these currents become denser toward the rear of the wing the problem is somewhat analogous to that of draining a flat field of the same size as the wing in which there is practically no precipitation at the front end and a gradually heavier precipitation toward the rear. This is accomplished by providing drainage channels that gradually increase in capacity toward the rear of the wing where they empty into the great ocean.

As this aerofoil moves through the air it does not cause a violent turbulence as does a flat wing, nor does it throw up a high bow wave as does a cambered wing. The vacuum channels provide easy paths for the smooth flow of the air which is gradually rarefied as it moves down the expanding channel. In a similar way the compression channels act to gently compress the air without any violent disturbance.

As any wing moves along it creates a rarefaction or suction just in rear of the wing. This is usually considered an unavoidable evil to be reduced as much as possible, but in the present case this suction is utilized to increase the lifting efficiency of the wing, since it draws the air along the channels, assisting in both rarefaction and compression.

As a result of the features above set forth the wing has a very high lifting efficiency; the pressure is very evenly distributed over the wing; and the center of pressure remains practically stationary for all angles of incidence.

In the ordinary wing only the forward third of the wing gives an efficient lift and hence it is advisable to use a wing having an aspect ratio of about 6, i. e., an entering edge six times as long as the fore and aft of the wing. The present structure provides means for giving the rear part of the wing a share of the lifting burden, and hence it is possible to use a wing that is longer fore and aft than it is along the entering edge, an aspect ratio of .6 having been found to be practicable. This means that a machine of great lifting capacity can be built with a relatively narrow wing span which will require only a limited space for landing and storing.

Although I have explained my invention as applied to a flat wing it will be obvious that vacuum and compression channels can be advantageously used on a wing of any shape or relative proportions.

The modified wing shown in Figure 20 is formed of two decks spaced apart and connected together at their front edges. Each deck is given the shape of the wing shown in Figure 3 except that the upper corners of the compression channels are rounded off as at 18 to facilitate the smooth flow of the air currents into the channels. Openings 20 extending through the upper deck are spaced along the bottom of the vacuum channels. As this wing moves along, the suction in rear of the wing tends to draw the air out of the space between the decks and the air above the wing is thereby sucked through the openings 20 increasing the rarefaction on the upper surface of the wing. It will be evident that in a double-decked wing the lower wing could be formed without the compression channels if so desired. The central portion of the wing is broken away in Figure 20 to indicate that it may be made of any desired width.

A vertical keel or leak board 21 is attached at each end of the wing and extends above and below the wing to prevent the air from leaking off the end of the wing and to assist in maintaining a compression under the wing and a vacuum above it. These leak boards also act as lee boards, or vertical keel surfaces. Similar leak boards may be used on the wing of Figure 3 as indicated by Figure 14.

Figures 1 and 2 illustrate one type of airplane embodying the improved aerofoil. The fuselage 22 is formed with a well 23 of open framework in which the propeller 24 revolves under any conventional motive power not shown. A framework 25 depends from the front part of the fuselage and carries a shaft 26 upon which the wing 27 is pivotally mounted. The rear end of the wing 27 is supported by rods 28 which are connected to any suitable control mechanism. To the rear of the well 23 a second framework 29 projects above the fuselage and carries a shaft 30 on which wing 31 is pivotally mounted, the front end of wing 31 being supported by rods 32 connected to the mechanism.

A horizontal rudder 33 is attached to the fuselage and an elevator 34 is mounted about the rudder and is pivoted at 34$^a$. These directing surfaces are operated by conventional controls not illustrated. Vertical keels 35 and 36 are attached to the fuselage and horizontal keels 37 are provided. Small lateral wings 38 are attached on each side of the well 23 near the center of gravity and are suitably actuated to control the lateral stability of the machine.

Attention is called to the fact that the forward wing is placed below and just in front of the propeller so that the suction of the propeller will greatly increase the rarefaction above this wing and hence the lifting power. The aft wing is placed just above and back of the propeller so that the air thrown to the rear by the propeller will increase the compression under the aft wing thereby increasing its lift. This position of the wings would be of benefit with any type of aerofoil, but it is particularly advantageous with the channeled wing herein set forth, as the compression and vacuum channels can make fullest use of the air flow of the propeller.

The advantages to be gained by providing an airplane with wings having a variable angle of incidence have been fully appreciated in the past, but no practical method of adjustably mounting the wings has heretofore been developed. The wing herein disclosed may be made relatively narrow across the width of the machine, and can therefore be easily mounted on a pivot as illustrated in Figure 1.

A mechanism for adjusting the angle of the wings is shown in Figures 6 to 10. The rods 32 are connected to the bell cranks 39 which are moved from hollow shafts 42 by cranks 41 and rods 40. The shafts 42 carry cranks 43 which are connected by rods 44 to cranks 45 mounted on the ends of a shaft 46 rotatably within a hollow shaft 47. The rods 28 are controlled by bell cranks 48 which are connected by rods 49 to cranks 50 carried on the shaft 51 rotatably mounted within shafts 42. The shaft 51 carries a crank 52 which is joined by a rod 53 to a crank 54 mounted on shaft 47. Shaft 46 carries a wheel 55 cooperating with a worm 56 mounted on shaft 57 which is journaled in a housing 58 formed on shaft 47. Shaft 47 is rotatably mounted in bearings 59 and 60 and carries within bearing 60 a wheel 61 meshing with a worm 62 formed on shaft 63 which is rotatable in the bearing 60.

When shaft 63 is rotated the worm 62 will move hollow shaft 47 and with it the shaft 46 thereby moving rods 28 and 32 to simultaneously vary the angle of incidence of both wings. When shaft 57 is rotated the worm 56 will rotate the shaft 46, shaft 47 remaining stationary, thereby moving only the rods 32 to alter the angle of incidence of the rear plane. The controls may be placed in any convenient part of the fuselage.

By this means the angle of incidence of both planes can be simultaneously increased to provide greater lift as in leaving the ground or when attempting to reach high altitudes. The control mechanism also permits the angle of incidence of each wing to be changed independently to trim the ship fore and aft whenever the cargo is unevenly distributed as after dropping a bomb or after using part of a load of gasoline.

The airplane shown in Figure 1 carries wheels for ground landing. The forward wheels 70 are mounted on rods 71 pivoted on each side of well 23. Guide rods 72 having stops 74 formed on one end are pivoted to rods 71 at the other end and slide through guides 73 rotatably mounted on framework 25. The rear wheels 74a are carried by brace rods 75 attached to the framework of the elevator 34. When the machine is resting on the ground the wheels are in the positions indicated in broken lines, the elevator being raised. As the machine rises the wheels move into the positions shown in solid lines with the elevator in any position desired by the pilot.

In the airplane shown diagrammatically in Figure 11 the body 76 has its upper and lower surfaces formed with vacuum and compression channels like those of the wing illustrated in Figure 3, thus utilizing these areas as lifting surfaces.

A motor 77 operating a propeller 78 is mounted on each side of the body. A forward wing 79 is mounted below and in front of each propeller and a rear wing 80 is mounted above and to the rear of each propeller. A pair of pontoons 81 are mounted below the machine forward of the center of gravity and a single pontoon 82 is mounted under the rear of the body. Each of the pontoons is constructed (Figure 13) as a hollow tapered float having its upper surface 83 formed with vacuum channels, its lower surface 84 formed with compression channels, and a leak board 85 attached to each side. This pontoon will insure an easy and smooth rise from the water and will act as an aerofoil when the machine is in the air.

What I claim is:

1. A hollow wing open at the rear, the upper deck of said wing having vacuum channels formed therein and openings through said deck, said openings being located in said vacuum channels.

2. A wing composed of two decks, the space between said decks being closed at the front of the wing and open at the rear of the wing, vacuum channels formed in the top surface of the upper deck and openings through said upper deck, said openings being located in said channels.

3. A wing having vacuum channels in its upper surface and compression channels in its lower surface, and a vertical leak board extending along one side of the wing and projecting above and below said wing, said leak board defining the outer wall of the adjacent channel.

4. In an airplane, a body, vacuum channels formed on the upper surface of said body, compression channels formed on the lower surface of said body, a propeller located on each side of said body, a wing located in front of and below each propeller, and a wing located above and to the rear of each propeller.

In testimony whereof I affix my signature.

BROR MAX SCHAUMAN.